United States Patent [19]
Nojiri et al.

[11] 3,965,054
[45] June 22, 1976

[54] FOAMABLE POLYOLEFIN COMPOSITION AND METHOD FOR MANUFACTURING FOAMED POLYOLEFIN

[75] Inventors: Akio Nojiri, Yokohama; Naonori Shiina, Tokyo; Hlroyuki Nakae, Yokohama; Hideyo Ueno, Hiratsuka; Isamu Namiki, Yokohama, all of Japan

[73] Assignee: The Furukawa Electric Co., Ltd., Tokyo, Japan

[22] Filed: Oct. 14, 1975

[21] Appl. No.: 622,375

Related U.S. Application Data

[63] Continuation of Ser. No. 457,392, April 2, 1974, abandoned.

[30] Foreign Application Priority Data

Apr. 10, 1973   Japan.............................. 48-40600
May 29, 1973    Japan.............................. 48-59966
June 4, 1973    Japan.............................. 48-62759
Oct. 30, 1973   Japan............................. 48-121902

[52] U.S. Cl..................... 260/2.5 HA; 260/2.5 FP; 260/42.18; 260/42.39; 260/47.46; 260/724; 260/DIG. 24

[51] Int. Cl.$^2$.................. C08J 9/06; C08J 9/08; C08J 9/10
[58] Field of Search ... 260/2.5 HA, 878 R, 94.9 GA

[56] References Cited
UNITED STATES PATENTS

| | | | |
|---|---|---|---|
| 3,388,051 | 6/1968 | Rainer et al. .................. | 260/878 R |
| 3,413,244 | 11/1968 | Landler et al................. | 260/2.5 HA |
| 3,542,702 | 11/1970 | Okada et al................... | 260/2.5 HA |
| 3,714,083 | 1/1973 | Nakoyama et al. ........... | 260/2.5 HA |
| 3,717,559 | 2/1973 | Oyama et al................. | 260/2.5 HA |
| T900,019 | 7/1972 | Murphy, Jr. et al. ........ | 260/94.96 A |

Primary Examiner—Morton Foelak
Attorney, Agent, or Firm—Kemon, Palmer & Estabrook

[57] ABSTRACT

The present invention provides a foamable polyolefin composition comprising a polyolefin, a crosslinking agent, a blowing agent decomposable at temperatures higher than the decomposition temperature of said crosslinking agent and a gas trapping agent as well as a method for manufacturing foamed polyolefin from said foamable polyolefin composition.

17 Claims, No Drawings

FOAMABLE POLYOLEFIN COMPOSITION AND METHOD FOR MANUFACTURING FOAMED POLYOLEFIN

This is a continuation of application Ser. No. 457,392, filed Apr. 2, 1974, now abandoned.

The present invention relates to a method for manufacturing foamed polyolefin and foamable compositions, and more particularly to a method for manufacturing crosslinked foamed polyolefin having uniform and fine cells and to foamable polyolefin compositions for providing such foamed products. It is known to manufacture foamed materials by crosslinking thermoplastic resin during or prior to expansion process in order to improve its viscoelastic property suitable for the expansion mechanism. For example, as described in U.S. Pat. No. 3,098,831, low-density foamed polyolefin having uniform and fine cells can be produced first by cross-linking polyolefin and then by foaming at elevated temperatures. However, as long as commercially available cross-linking agent and blowing agent are used, in order to crosslink without decomposing the blowing agent, long time heating—under pressure in most cases — is required at low temperatures at which the crosslinking agent decomposes but the blowing agent does not; but this method cannot provide foamed products continuously and efficiently at low cost.

Disclosed in British Pat. No. 1,126,857 is a method of manufacturing crosslinked polyolefin foam by heating a mixture of a polyolefin, a crosslinking agent and a blowing agent decomposable at higher temperature than the decomposition temperature of said crosslinking agent above a temperature of the decomposition of the blowing agent. This method provides low density foamed polyethylene sheet. But the sheet has large cells and wrinkles on its surfaces. The blowing agent is not utilized with high efficiency because some part of gas liberated from the blowing agent escapes to the outside failing to contribute to cell growth and thick foamed sheet with uniform, fine cells, having no void is difficult to obtain.

Foamed products having relatively uniformly fine cells are obtained by subjecting polyolefin containing a blowing agent to ionizing radiation for its crosslinking and heating the crosslinked compound to foam (Japanese Patent Publication No. 24131/64). This method, however, is limited to thin foamed products and needs much expenditure for the irradiating equipment.

It is therefore an object of the present invention to provide a method for manufacturing polyolefin foams having smooth and beautiful surface and uniform and fine closed cells.

Another object of the present invention is to provide a method for continuously and easily manufacturing foamed polyolefin sheet entirely free from voids even in thick sheet.

Still another object of the present invention is to provide a method for manufacturing the foamed polyolefin at low cost.

Further object of the present invention is to provide a foamable polyolefin composition suitable for the above-mentioned method to utilize very effectively a blowing agent contained therein.

According to the present invention there is provided a method which comprises the steps of mixing a polyolefin with a chemical crosslinking agent, a blowing agent thermally decomposable at higher temperatures than the decomposition temperature of said crosslinking agent and a gas trapping agent, shaping the mixture, and then heating the shaped mixture at temperatures above the decomposition temperature of the blowing agent.

The present invention provides a method comprising the steps of adding a crosslinking agent and a blowing agent to a polyolefin, further adding a gas trapping agent thereto and mixing therewith, and then foaming the resultant mixture by heating as described before. The reason why such polyolefin foams having excellent properties may be produced according to the invention is inferred as follows:

1. The radical generated by the decomposition of the crosslinking agent but not directly useful for crosslinking polyethylene is trapped by using a gas trapping agent. In the absence of a gas trapping agent radicals generated by the decomposition of the crosslinking agent either extract hydrogen atoms from the polymer or recombine with each other thereby producing gaseous low-molecular-weight compounds. These low-molecular-weight compounds get together and form nuclei of cells in the polymer. If cell nuclei occur in the polymer before the subsequent decomposition of a blowing agent dispersed therein, the gas compounds generated by the decomposition of the blowing agent concentrate into the nuclei and grow into large cells and voids.

The emergence of polyolefin foams of such excellent properties as described above can be explained on the assumption that gas generated by the decomposition of a crosslinking agent is eliminated by the use of a gas trapping agent and the blowing agent decomposes in the absence of cells acting as nuclei.

The effect of gas trapping agent is thus noticed clearly from the following tests.

A crosslinked polyethylene sheet was obtained by crosslinking, under normal pressure at 200°C, sheetlike material produced by adding 1.0 part by weight of dicumyl peroxide as crosslinking agent to 100 parts by weight of polyethylene and kneading. As a result, numerous cells were formed in the matrix. On the other hand, a crosslinked polyethylene sheet was obtained by treating under the same condition as the above test except addition of 0.4 part by weight of triallyl cyanurate as gas trapping agent to polyethylene together with the crosslinking agent. The result was that no cell was formed at all in the matrix.

2. Gas trapping agent, when used with crosslinking agent, accelerates crosslinking to some extent. This functions as another effect of making the cell finer and the surface of the foam obtained smoother.

3. Another favorable effect of gas trapping agent is that crosslinking takes place uniformly when the gas trapping agent acts with crosslinking agent.

Owing to the above effects (1), (2) and (3) of the gas trapping agent, crosslinking precedes uniformly and sufficiently and then the blowing agent decomposes while free from cell nuclei. Therefore, in case proper condition is selected for the production of foamed sheet, a sheet having fine cells is obtained, in which each particle of the blowing agent about $20\mu$ in size forms each cell.

In the system where gas trapping agent is used, the decomposition temperature of crosslinking agent does not decrease. The gas trapping agent has also a function of increasing crosslinking speed, which improves the viscoelastic property of the resin in the relatively early stage of foaming process. It is consequently inferred that at the decomposition step of blowing agent collapse of cell walls is suppressed by rapid crosslinking, thereby producing a foamed sheet as thick as 1 inch absolutely free from void with high efficiency of blowing agent utilization.

The present invention is very useful industrially as it manufactures foamed products of excellent property in a simplified manner as described above.

The polyolefin in the present invention is low-density polyethylene, medium- and high-density polyethylene, and polypropylene and copolymer composed mainly of olefin, such as ethylene-butene copolymer, ethylene-propylene copolymer and ethylene-vinyl acetate copolymer.

The crosslinking agents used in the present invention are those organic peroxides such as dicumyl peroxide, di-tert-butyl peroxide, 1, 3-bis (tert-butyl peroxyisopropyl) benzene, 2, 5-dimethyl-2,5-di(tert-butylperoxy) hexane, and 2,5-dimethyl-2,5-di(tert-butylperoxy) hexyne-3; azide compound such as 1,9-nonane-bis-sulfon azide and 1,7-heptane-bis(sulfon azide); and silicon-containing peroxide such as silyl peroxide. Among those crosslinking agents should be selected one which thermally decomposes at a lower temperature than the decomposition temperature of the blowing agent to be used.

The quantity of crosslinking agent used depends on the type of resin and blowing agent and the quantity of blowing agent; however, it is usually used, in a quantity of 0.01 to 3 parts by weight on the basis of 100 parts of resin (unless otherwise indicated, all parts are hereinafter given by weight).

The blowing agent used in the present invention at least has decomposition temperature higher than the softening point of resin and, further, has decomposition temperature higher than that of crosslinking agent and is used usually in an amount of as much as from 0.1 to 30 parts on the basis of 100 parts of resin. The blowing agent includes, for example, azodicarbonamide, dinitrosopentamethylene tetramine, barium azodicarboxylate, hydroazodicarbonamide, p-toluene sulfonyl semicarbazide, trihydrazine triazine. It is preferable that use is made of a blowing agent which evolves gas in a volume of 2 cc per one gram of the blowing agent (2 cc/g) or less in 2 minutes after heating to 180°C begins, and more preferably which evolves gas in a volume of 2 cc/g or less and 35 cc/g or less in 2 and 10 minutes respectively, after heating to 180°C begins.

The total gas evolution hereinsaid is easily determined by the following procedure:

A gas burrette which permits reading down to 0.1 mm either is connected to a flask that can contain such liquid as silicone oil or liquid paraffin having a viscosity of about 100 centistokes, and above 100 ml of such liquid medium is charged in the flask and held at a temperature of 180°C, and an accurate amount of 1.000g of blowing agent is introduced in the liquid medium and dispersed uniformly in the liquid. The initial decomposition takes place gradually as the blowing agent decomposes thermally and then the follow-up decomposition succeeds the former. The evolution of gas can be read accurately by the connected gas burette.

In the above procedure, it is desirable that (a) the blowing agent is dried beforehand a 60°C for 2 or more hours and accurately weighed and (b) thermal decomposition takes place while each particle of the blowing agent is as separate from each other as possible; accordingly, 1.000g of blowing agent is weighed and then decomposed in 100 ml of liquid with stirring.

The decomposition of a blowing agent may be classified into the initial decomposition step and follow-up decomposition step. The behavior of decomposition can be known from the decomposition curve in which the quantity of gas evolved at a given temperature is plotted against time. The measurement temperature may be either 170° or 190°C, but 180°C is preferred for the blowing agent used in polyolefin, as the measurement is carried out with good accuracy in a short time. The gas evolution test may be conducted as described before.

The above test method of blowing agent will hereinafter be referred to as "the thermal decomposition test".

The blowing agent evolves gas as a result of thermal decomposition in the resin. In this case, if crosslinking is not effected sufficiently, large cells develop or the gas escapes outside the resin matrix, failing to obtain a good low-density foamed product.

Consequently, where the decomposition temperature of the blowing agent is higher than that of the crosslinking agent, crosslinking first begins in the course of heating process and foaming follows, thus giving a good low-density foamed product.

A blowing agent is an organic compound, which should therefore possess a certain inherent decomposition temperature. However, because of impurities occurring or entering in the production process of the agent or the difference in heat capacity ascribable to the particle size, the decomposing temperature varies from particle to particle. Accordingly, the blowing agent has a certain range of distribution of the decomposition temperature. For convenience, the decomposition temperature range, as briefly stated above, may be classified into two portions: one is as it were the initial decomposition in which a few percent of particles decompose before most of particles decompose, and the other is as it were the follow-up decomposition which succeeds the former. According to another aspect of the present invention, foamed polyolefin products having more excellent properties may be obtained when use is made of not only a gas trapping agent together with a crosslinking agent but also a blowing agent which evolves gas as little as possible at the initial decomposition stage.

The blowing agent which meets the above condition may be selected by the thermal decomposition test above mentioned.

Accordingly, it is preferable to use the blowing agent that evolves gas in a volume of not more than 2 cc/g in 2 minutes after heating to 180°C in the thermal decomposition test. It is because the resin is almost completely crosslinked up to 2 minutes after heating to 180°C and nucleus cells almost do not occur which are the cause for large cells in the case of the total gas evolution per gram of blowing agent being not more than 2 cc. Moreover, when the total gas volume evolved is not more than 2 cc/g in 2 minutes after heating to 180°C and not more than 35 cc/g in 10 minutes after heating to 180°C, further more excellent foamed products may be obtained. In this case the decomposition of the blowing agent takes place not in a rapid manner at both initial and follow-up decomposition steps, that is, the blowing agent is supposed to display slow or moderate decomposition behavior at both initial and follow-up decomposition steps. It is therefore presumed that collapse of cell walls due to rapid expansion of cells does not take place. Accordingly, more desirable foamed product is obtained.

A gas trapping agent in the present invention is added to polyolefin together with a crosslinking agent and traps the decomposed gas evolved from the crosslinking agent on heating, thereby performing crosslinking without forming nucleus cells. This gas trapping agent may be classified into 5 classes as follows:

Class 1

Di- or tri-allyl ester of cyanuric acid or isocyanuric acid: for example, triallyl cyanurate, triallyl isocyanurate, etc.

Class 2

Polyallyl ester of polycarboxylic acid: for example, triallyl trimellitate, triallyl trimesate, triallyl pyromellitate, triallyl-(benzophenone tetracarboxylate), diallyl oxalate, diallyl succinate, diallyl adipate, etc.

Class 3

Compounds having two or more acryloyloxy or methacryloyloxy radicals: for example, diethylene glycol diacrylate, polyethylene glycol diacrylate, trimethylolpropane triacrylate, 1,2,3-propanetriol triacrylate, 1,3,5-triacryloyloxybenzene, ethylene glycol dimethacrylate, diethylene glycol dimethacrylate, trimethylolpropane trmethacrylate, 1,4-dimethacryloyloxybenzene, etc.

Class 4 polymers having many double bonds in side chains: for example, 1,2-polybutadiene, etc.

Class 5

Others: triallyl phosphate.

Favorable are gas trapping agents belonging to Classes 1 and 3. Among them, the following gas trapping agent is especially effective: triallyl cyanurate, triallyl isocyanurate, trimethylpropane triacrylate and trimethylolpropane trimethacrylate. Above all, triallyl cyanurate and triallyl isocyanurate are markedly effective, and the most uniform crosslinking is obtained with higher speed when used.

The gas trapping agent is used usually in a quantity of as much as from 0.01 to 2 parts on the basis of 100 parts of resin although the quantity more or less depends on the kind of resin, crosslinking agent and its amount used, and blowing agent used as well as on heating conditions. The principal role of gas trapping agent is to trap the gas evolved from the crosslinking agent. Accordingly, when it is used in a large amount, its crosslinking promotion effect as an incidental function becomes excessive and the resin is markedly denatured, preventing sufficient foaming. For such reason gas trapping agent should be used in a very small amount of as little as from 0.01 to 2 parts, preferably 0.01 to 1 part, more preferably 0.01 to 0.5 part.

For the production of foams from low-density polyethylene, it is preferable to add 0.2 to 0.8 part of organic peroxide as crosslinking agent and 0.3 to 0.8 part of gas trapping agent to 100 parts of the polyethylene.

In the present invention, resin, crosslinking agent, gas trapping agent, and blowing agent are kneaded prior to thermal foaming. Kneading is conducted usually by Henschel mixer, mixing roll Banbury mixer, extruder, etc. Care must be exercised not to decompose the crosslinking agent and the blowing agent in this case.

The resin composition of the present invention is shaped into plate, sheet, particle, etc. by an extruder, press, calender roll, etc. It is important to avoid the decomposition of crosslinking agent and blowing agent in this process as is the case with the kneading process.

In foaming process, heating is performed usually in one step by elevating temperature so high as to decompose crosslinking agent and blowing agent. However, two-step heating process may be adopted so that crosslinking agent is first decomposed and subsequently blowing agent is decomposed by further elevating temperature. Decomposition of crosslinking and blowing agents may be effected while heating under high pressure and then expansion may be carried out by reducing its pressure. Preliminarily shaped foamable particles can be foamed in a metallic mold into foamed products.

Sheet-like foamable material may be turned into foamed sheet continuously by heating it on wire-net conveyor in a hot-air oven. In this process, a foamed sheet as thick as 25 mm having very smooth surface and having nearly isotropically expanded, uniform fine cells is produced when gas trapping agent is used, while the sheet thickness is limited to 15 mm when the gas trapping agent is not used. When the sheetlike foamable material is foamed according to the conventional process without gas trapping agent, unless the surface heating method (U.S. Pat. No. 3,651,183) is employed for heating the surface intensely before foaming, the sheet surface sticks to the wire-net conveyor during the foaming, so that the foamed sheet with its smooth surfaces can not be obtained.

According to the present invention, there is, however, no such trouble mainly because the crosslinking takes place early and rapidly before the foaming. If the blowing agent decomposes in a large amount before or during the crosslinking, the possibility of such sticking to the wire-net conveyor is accelerated by the expansion effect of the foaming sheet.

Therefore the prevention of the sticking to the wire-net is more effectively attained by the use of the blowing agent which meets the above-mentioned decomposition condition defined by the thermal decomposition test.

Another reason why the foamed sheet does not stick to the wire-net in the method of the present invention is as follows: After the crosslinking is completed, the composition of the sheet has an increased melting point and heavily decreases in flowability. Therefore the sheet thus crosslinked does not stick to the wire-net. Even if the foamable sheet slightly sticks to the wire-net before the foaming, the foaming sheet can separate from the wire-net owing to the expanding phenomenon of the sheet itself. When the sheet is heated on a wire-net or screen mesh, a great number of local expansions transiently occur at all places on the foaming sheet creepingly one after another during the expansion until finally the uniform expansion is completed over the whole sheet. The sheet rises in a corrugated form due to the local expansions in the course of expansion process and the foamed sheet peels from the wire-net owing to this rising function. After the completion of the expansion, the foamed polyolefin sheet produced in this way is similar to its original shape, straight in edge lines and rectangular in cross section, thus requiring no edge trimming.

When practicing the present invention, other thermostatic resin, natural or synthetic rubber compatible with polyolefin may be mixed and used.

If necessary the following substances may be added to polyolefin; fillers such as glass fiber, asbestos, calcium carbonate, gypsum, silica, carbon black, titanium oxide; pigment; flame retardant such as antimony trioxide and chlorinated paraffin.

EXAMPLE 1

Various kinds and amounts of gas trapping agent, crosslinking agent, and blowing agent listed in Table 1 were blended with resin, and the resultant mixture was kneaded by a mixing roll and formed into 3 mm thick sheets by a press without decomposing the crosslinking agent and blowing agent. The resin used was a low-density polyethylene having an MI (melt index) of 1.0. The blowing agent evolved gas in a volume of 0.0 cc/g and 4.0 cc/g in 2 and 10 minutes respectively after heating to 180°C began in the thermal decomposition test. The above sheets of the composition were foamed by heating at 220°C in an air thermostat and the foamed sheets were obtained, having characteristic shown in Table 1. It is seen that the cell size of the foamed sheets was far smaller than that of foamed sheet of conventional composition (No. 8—sample of Control 1).

Table 1

| No. | Blowing agent | Crosslinking agent | Gas trapping agent | Foam density (g/cm$^3$) | Cell Size (mm) |
|---|---|---|---|---|---|
| 1 | ADCA (1) 10phr (3) | DCP (2) 0.6phr | triallyl cyanurate 0.4phr | 0.052 | 0.22 |
| 2 | ADCA 10phr | DCP 0.7phr | triallyl isocyanurate 0.4phr | 0.048 | 0.32 |
| 3 | ADCA 10phr | DCP 0.6phr | trimethylolpropane trimethacrylate 0.3phr | 0.053 | .25 |
| 4 | ADCA 10phr | 1,3-bis(t-butyl peroxyisopropyl) benzene 0.4phr | ditto 0.3phr | 0.054 | 0.30 |
| 5 | ADCA 10phr | DCP 0.7phr | 1,2-polybutadiene (M.W(4)=3000) 1.0phr | 0.049 | 0.37 |
| 6 | ADCA 10phr | DCP 0.5phr | triallyl trimellitate 0.5phr | 0.050 | .37 |
| 7 | Dinitrosopentamethylene tetramine 10phr | DCP 0.6phr | triallyl cyanurate 0.3phr | 0.055 | 0.35 |
| 8 (Control 1) | ADCA 10phr | DCP 0.7phr | — | 0.058 | 0.55 |

Note
(1) ADCA: Azodicabonamide
(2) DCP: Dicumyl peroxide
(3) phr: Parts per hundred parts of resin
(4) M.W.: Molecular weight

EXAMPLE 2

The gas trapping agent, crosslinking agent, and blowing agent listed in Table 2 were blended with a resin, and the resultant mixture was kneaded by a mixing roll without decomposing the crosslinking agent and blowing agent then made into 2 mm thick sheets by a press. The resin used was a high-density polyethylene having an MI of 6.0. The blowing agent evolved gas in a volume of 0.0 cc/g and 6.0 cc/g in 2 and 10 minutes, respectively, after heating to 180°C started. The above sheets of composition were foamed at 235°C in an air thermostat and the foamed sheets were obtained, having the characteristics shown in Table 2. These foamed sheets were good in both density and cell size as compared with the foamed sheets of conventional composition (No. 3 — sample of Control 2).

Table 2

| No. | Blowing agent | Crosslinking agent | Gas trapping agent | Foam density (g/cm$^3$) | Cell size (mm) |
|---|---|---|---|---|---|
| 1 | ADCA(1) 10phr(2) | 2,5-dimethyl 2,5-di(t-butyl peroxy-hexyne-3 2.0phr | trimethylolpropane trimethacrylate 0.8phr | 0.062 | 0.48 |
| 2 | p-toluene sulfonyl semicarbozide 12phr | '' 3.0phr | triallyl isocyanurate 0.9phr | 0.075 | 0.40 |
| 3 (Control) | ADCA 10phr | '' 3.0phr | — | 0.098 | 0.72 |

Table 2-continued

| No. | Blowing agent | Crosslink-ing agent | Gas trapping agent | Foam density (g/cm³) | Cell size (mm) |
|-----|---------------|---------------------|--------------------|-----------------------|----------------|
| 2)  |               |                     |                    |                       |                |

Note:
(1)ADCA: Azodicarbonamide
(2)phr: parts per hundred parts of resin

EXAMPLE 3

The gas trapping agent, crosslinking agent, and blowing agent listed in Table 3 were blended with the resin shown in Table 3 and the resultant mixture was kneaded by a mixing roll and formed into a 3 mm-thick sheet by a press. The blowing agent evolved gas in a volume of 0.8 cc/g and 20 cc/g in 2 and 10 minutes, respectively after heating to 180°C started.

Table 3

| No. | Resin | Blowing agent | Cross-linking agent | Gas trap-ping agent | Foam density (g/cm³) | Cell size (mm) |
|-----|-------|---------------|---------------------|---------------------|----------------------|----------------|
| 1 | Ethylenevinyl acetate co-polymer con-taining 20% of vinyl acetate | ADCA(1) 10phr(3) | DCP(2) 0.8phr | triallyl cyanurate 0.4phr | 0.050 | 0.36 |
| 2 (Control 3) | Ethylenevinyl acetate co-polymer con-taining 20% of vinyl acetate | ADCA 10phr | DCP 0.8phr | — | 0.075 | 0.80 |

Note:
(1)ADCA: Azodicarbonamide
(2)DCP: Dicumyl peroxide
(3)phr: Parts per hundred parts of resin The above sheet of the composition was foamed at 220°C in an air thermostat and the foamed sheet was obtained, having the characteristics shown in Table 3. It is seen that the foamed sheet was good in both density and cell size as compared with the foamed sheets obtained in the conventional method (No. 2 — sample of Control 3).

EXAMPLE 4

With 100 parts of a low-density polyethylene having an MI of 2.0 were blended 10 parts of azodicarbonamide as blowing agent evolving gas in a volume of 0.0 cc/g and 8.0 cc/g in 2 minutes and 10 minutes, respectively, after heating to 180°C started in the thermal decomposition test, 0.3 part of 1,3-bis(tert-butyl peroxyisopropyl) benzene as crosslinking agent, and 0.3 part of triallyl isocyanurate as gas trapping agent, and the resultant mixture was extruded into a 10 mm-thick, 410 mm-wide sheet by an extruder without decomposing the crosslinking and blowing agent. When this sheet was foamed at 205°C in a hot-air heating oven equipped with wire-net conveyor, 25 mm-thick, 1100 mm-wide foamed sheet with very smooth and lustrous surface and containing uniform and fine cells of 0.45 mm in average cell size was obtained. No voids were in any portion of this foamed sheet.

CONTROL 4

Using the same polyethylene as in Example 4, 10 parts of azodiacarbonamide as in Example 4 and 0.3 to 1.0 part of 1,3-bis(tert-butyl peroxyisopropyl) benzene were added to and blended with the polyethylene without using triallyl isocyanurate. The foamed sheet was obtained from the mixture in the same method under the same condition as in Example 4. This foamed sheet was a very poor product having wrinkles or cracks on the surface, voids and average cell size of 0.89 mm.

EXAMPLE 5

With 100 parts of a low-density polyethylene having an MI of 1.0 were blended 10 parts of azodicarbonamide as blowing agent as in Example 4, 0.6 part of dicumyl peroxide as crosslinking agent, and 0.4 part of triallyl cyanurate as gas trapping agent, and the resultant mixture was kneaded by a mixing roll without decomposing crosslinking agent and blowing agent. The kneaded composition was made into a 3 mm thick sheet by a steam-heated press. A small 5 cm-long and 5 cm-wide piece was cut from this sheet and immersed in a metal bath at 200°C for 7 minutes, thus obtaining a foam with very smooth surface and containing uniform and fine cells. The sliced face of the foam looked like baby's skin. (This foam is referred to as A.) In contrast thereto, 10 parts of azodicarbonamide as blowing agent and 1.0 part of dicumyl peroxide as crosslinking agent were added to the same 100 parts of polyethylene without adding gas trapping agent, and kneaded and sheeted in the same method as above, and then foamed under the same condition. The foam was very uneven on the surface and did not contain fine cells. (This foam is referred to as B.) The surface condition, density, and average cell size of the two, A and B, foams are indicated in Table 4.

Table 4

| Foamed body | Surface condition | Foam density (g/cm³) | Effective utiliza-tion of blowing agent (%) | Average cell size (mm) |
|-------------|-------------------|----------------------|---------------------------------------------|------------------------|
| A | Smooth and lustrous | 0.050 | 80 | 0.15 |
| B (Control 4) | Very uneven | 0.061 | 69 | 0.50 |

EXAMPLE 6

With 100 parts of a low-density polyethylene having an MI of 2.0 were blended blowing agent, crosslinking agent, and gas trapping agent of the kind and in the amount shown in Table 5, and the mixture was kneaded by a mixing roll and then foamed into 2 mm thick sheets by an extruder. The sheets were foamed at 240°C through a blowing oven equipped with a wire-net conveyor and the foamed sheets having the density and cell size shown in Table 5 were obtained.

Table 5

| No. | Blowing agent Total gas volume evolved for 2 minutes after heating to 180°C starts (cc) | phr(3) | Crosslinking agent (phr) | Gas trapping agent (phr) | Foam density (g/cm³) | Cell size (mm) |
|---|---|---|---|---|---|---|
| 1 | 0.8 | 10 | DCP(1) :0.75 | TAIC(2) :0.3 | 0.056 | 0.32 |
| 2 | 4.5 | 10 | DCP:0.75 | '' | 0.057 | 0.40 |
| 3 (Control 5) | The same blowing agent as No. 1 | 10 | DCP:0.75 | TAIC:0 | 0.058 | 0.62 |

Note:
(1)DCP: dicumyl peroxide
(2)TAIC: Triallyl isocyanurate
(3)phr: Parts per hundred parts of resin The effect of using a gas trapping agent is seen from the comparison between the foamed sheet of No. 1 and that of No. 3 in Table 5. By comparing No. 1 with No. 2, it is noticed that the difference in gas volume decomposed in the initial stage affects the cell size of the final product.

EXAMPLE 7

With 100 parts of low-density polyethylene having an MI of 2.0 were blended the blowing agent, crosslinking agent, and gas trapping agent of the kind and in the amount shown in Table 6, and the mixture was compounded by a mixing roll and then shaped into 2 mm-thick sheets by an extruder. The sheets were foamed at 240°C through a blowing oven equipped with a wire-net conveyor, and the foamed sheets having the properties shown in Table 6 were obtained.

between No. 1 and No. 2 indicates the effect of difference of gas volume decomposed in the follow-up stage.

EXAMPLE 8

With 100 parts of the same polyethylene as in Example 4 were blended 18 parts of azodicarbonamide as blowing agent evolving gas in a volume of 1.0 cc/g and 20 cc/g in 2 and 10 minutes, respectively, after heating to 180°C began in the thermal decomposition test, 0.5 part of dicumyl peroxide as crosslinking agent, and 0.3 part of triallyl isocyanurate and 0.2 part of trimethylolpropane trimethacrylate as gas trapping agent. The resultant mixture was extruded into a 2 mm thick sheet by an extruder without decomposing the cross-linking agent and the blowing agent. The sheet was then foamed at 245°C through the same blowing oven as in Example 4, and a foamed sheet of uniform and fine cells and having a density of 0.026 g/cm³ and an average cell size of 0.40 mm was obtained.

For comparison a foamed sheet was obtained from the same foamable sheet as above except that no gas trapping agent is used. The foamed sheet had a density of 0.031 g/cm³ and an average cell size of 0.75 mm. It was found from the above results that a foamed sheet with a lower foam density was obtained because the effective utilization of blowing agent was increased by using the gas trapping agent.

Table 6

| No. | Total gas volume evolved for 2 minutes after heating to 180°C starts (cc) | Total gas volume evolved for 10 minutes after heating to 180°C starts (3) (cc) | phr (phr) | Crosslinking agent | Gas trapping agent )phr) | Foam density (g/cm³) | Cell size (mm) |
|---|---|---|---|---|---|---|---|
| 1 | 0.5 | 8 | 10 | DCP(1) :0.6 | TAC(2) :0.4 | 0.045 | 0.27 |
| 2 | 0.5 | 40 | 10 | '' | '' | 0.055 | 0.36 |
| 3 (Control 6) | 0.5 | 8 | 10 | '' | TAC:0 | 0.057 | 0.56 |
| 4 (Control 7) | 0.5 | 8 | 10 | DCP:0.8 | '' | 0.057 | 0.62 |
| 5 (Control 8) | 0.5 | 8 | 10 | DCP:1.0 | '' | 0.059 | 0.58 |

Note:
(1)DCP: Dicumyl peroxide
(2)TAC: Triallyl cyanurate
(3)phr: parts per hundred parts of resin The effect of using gas trapping agent is seen from the comparison between the foamed sheet of No. 1 and those of Nos. 3, 4 and 5 in Table 6. The comparison

EXAMPLE 9

With 100 parts of the same polyethylene as in Example 4 were added 15 parts of azodicarbonamide as blowing agent evolving gas in a volume of 0.0 cc/g and 4.0 cc/g in 2 and 10 minutes respectively after heating to 180°C started in the thermal decomposition test, 0.6 part of dicumyl peroxide as crosslinking agent, and 0.3 part of triallyl cyanurate as gas trapping agent. The resultant composition was extruded into a sheet of the same form as in Example 4. The sheet was held at 160°C under normal pressure for 10 minutes and then foamed through a blowing oven (the same as in Example 4), and a foamed sheet with such characteristic as shown in Table 7 was obtained. (This foamed sheet is referred to as C.) The foamed sheet C had very fine cells as indicated in Table 7 and very smooth baby's skin-like sliced face. On the other hand, a foamed sheet was prepared without using a gas trapping agent in the same method under the same condition, and nothing but foamed sheet having coarse cells was obtained as shown in Table 7. (This foamed sheet is referred to as D.).

Table 7

| Foamed sheet | Foam density (g/cm³) | Cell size (mm) |
| --- | --- | --- |
| C | 0.033 | 0.15 |
| D (Control 9) | 0.040 | 0.60 |

EXAMPLE 10

The mixture composed of the compositions as shown in Table 8 was kneaded by a pressurized kneader without decomposing crosslinking agent and blowing agent, and then shaped into a 1.7 mm thick sheet form by an extruder. The sheet was passed through a blowing oven at a temperature of 240°C on a wire-net conveyor for foaming, thus obtaining 5 mm thick and 1500 mm wide smooth foamed sheet. The blowing agent used evolved gas in a volume of 1.5 cc/g and 20 cc/g in 2 and 10 minutes, respectively, after heating to 180°C started in the thermal decomposition test. The physical properties of foamed sheet were measured and the result is shown in Table 9. It is shown in this result that the foamed sheet exhibited better result when gas trapping agent was added.

Table 8

| No. | Resin | Blowing agent | Cross-linking agent | Gas trapping agent |
| --- | --- | --- | --- | --- |
| 1 | Low-density polyethylene (MI=1.0) 100 phr(3) | ADCA(1) 10 phr | DCP(2) 0.6 phr | Triallyl isocyanurate 0.4 phr |
| 2 (Control 10) | " | " | DCP 1.0 phr | — |

Note:
(1)ADCA: Azodicarbonamide
(2)DCP: Dicumyl peroxide
(3)phr: Parts per hundred parts of resin Table 9

| No. | 1 | | 2 (Control 9) | |
| --- | --- | --- | --- | --- |
| Density (g/cm³) | 0.031 | | 0.034 | |
| Cell size (mm) | Lengthwise | 0.42 | 0.70 | |
| | Widthwise | 0.40 | 0.56 | |
| | Thicknesswise | 0.38 | .60 | |
| Tensile strength(1) (kg/cm²) | 4.2 | | 3.2 | |
| Elongation(1) (%) | 110 | | 100 | |
| Compression- | | | | |

Table 9-continued

| No. | 1 | 2 (Control 9) |
| --- | --- | --- |
| deflection load at 25% compression (1) (kg/cm²) | 0.39 | 0.36 |
| Thermal conductivity (Kca/mhr°C) | 0.030 | 0.037 |

Note:
(1)The test was conducted in accordance with JIS (Japanese Industrial Standard) K 6767.

What we claim is:

1. A method for manufacturing foamed polyolefin comprising:
   a. mixing 100 parts polyolefin selected from the group consisting of ethylene homopolymer, ethylene copolymer, propylene homopolymer and propylene copolymer with 0.01 to 3 parts of cross-linking agent selected from the group consisting of organic peroxides, azide compounds and silicon-containing peroxides, 0.01 to 30 parts of blowing agent which decomposes at a temperature higher than the decomposition temperature of said cross-linking agent to evolve gas in a volume of not more than 2cc per gram of blowing agent in 2 minutes after heating to 180°C begins in the thermal decomposition test, and 0.01 to 2 parts of gas trapping agent selected from the group consisting of a diallyl cyanurate, diallyl isocyanurate, triallyl cyanurate, and triallyl isocyanurate,
   b. shaping the mixture into a desired form and then
   c. heating the shaped mixture above the decomposition temperature of said blowing agent.

2. A method for manufacturing foamed polyolefin according to claim 1 wherein 0.01 to 3 parts by weight of the crosslinking agent, 0.1 to 30 parts by weight of the blowing agent, and 0.01 to 2 parts by weight of the gas trapping agent are added to 100 parts by weight of the polyolefin.

3. A method for manufacturing foamed polyolefin according to claim 2 wherein 0.01 to 1.0 part by weight of the gas trapping agent is added to 100 parts by weight of the polyolefin.

4. A method for manufacturing foamed polyolefin according to claim 2 wherein 0.01 to 0.5 part by weight of the gas trapping agent to added to 100 parts by weight of the polyolefin.

5. A method for manufacturing foamed polyolefin according to claim 1 wherein the blowing agent evolves gas in a volume of not more than 2 cc per one gram of the blowing agent and not more than 35 cc per one gram of the blowing agent in 2 and 10 minutes, respectively, after heating to 180°C begins in the thermal decomposition test.

6. A method for manufacturing foamed polyolefin according to claim 1 wherein the heating of the shaped mixture is carried out under normal pressure.

7. A method for manufacturing foamed polyolefin according to claim 1 wherein the mixture is shaped into sheet form and thereafter heated for forming on a wire-net in a hot-air heating oven.

8. The method of claim 1 wherein said organic peroxide is selected from the group consisting of dicumyl peroxide; di-tert. butyl peroxide; 1,3-bis (tert. butyl peroxyidopropyl) benzene; 2,5-dimethyl-2,5-di (tert.

butylperoxy) hexane and 2,5-dimethyl-2,5-di(tert. butylperoxy) hexyne-3.

9. The method of claim 1 wherein said azide compound is 1,9-nonane-bis-sulfonazide or 1,7-heptane-bis-sulfonazide.

10. The method of claim 1 wherein said cross-linking agent is silyl peroxide.

11. The method of claim 1 wherein said blowing agent is selected from the group consisting of azodicarbonamide, dinitrosopentamethylene tetramine, barium azodicarboxylate, hydroazodicarbonamide, p-toluene sulfonyl semicarbazide and trihydrazine triazine.

12. The method of claim 1 wherein said ethylene copolymer is selected from the group consisting of ethylenebutene copolymer, ethylene-propylene copolymer and ethylene-vinyl acetate copolymer, said copolymers being composed mainly of ethylene.

13. A foamable polyolefin composition comprising the following ingredients in the parts by weight specified:
   a. 100 parts polyolefin selected from the group consisting of ethylene homopolymer, ethylene copolymer, propylene homopolymer and propylene copolymer, said copolymers being composed mostly of said olefin,
   b. 0.01 to 3 parts of cross-linking agent selected from the group consisting of organic peroxides, azide compounds and silicon-containing peroxides,
   c. 0.1 to 30 parts of blowing agent which decomposes at a temperature higher than the decomposition temperature of said cross-linking agent to evolve gas in a volume of not more than 2cc per gram of the blowing agent in 2 minutes after heating to 180°C begins in the thermal decomposition test, and
   d. 0.01 to 2 parts of a gas trapping agent selected from the group consisting of diallyl cyanurate, diallyl isocyanurate, triallyl cyanurate and triallyl isocyanurate acrylic or methacrylic acid with a polyol or polyoxy-benzene containing at least two acrylate or methacrylate groups, 1, 2-polybutadiene and triallyl phosphate.

14. A foamable polyolefin composition according to claim 13 wherein 0.01 to 1.0 part by weight of the gas trapping agent is present on the basis of 100 parts by weight of the polyolefin.

15. A foamable polyolefin composition according to claim 13 wherein 0.01 to 0.5 part by weight of the gas trapping agent is present on the basis of 100 parts by weight of the polyolefin.

16. A foamable polyolefin composition according to claim 13 wherein the blowing agent evolves gas in a volume of not more than 2 cc per one gram of the blowing agent and not more than 35 cc per one gram of the blowing agent in 2 and 10 minutes respectively after heating to 180°C begins in the thermal decomposition test.

17. A foamable polyolefin composition according to claim 13 which comprises 100 parts by weight of a low-density polyethylene, 0.2 to 0.8 part by weight of an organic peroxide as crosslinking agent, 0.1 to 30 parts by weight of a blowing agent evolving gas in a volume of not more than 2 cc per one gram of the blowing agent and not more than 35 cc per one gram of the blowing agent in 2 and 10 minutes respectively after heating to 180°C begins in the thermal decomposition test, and 0.3 to 0.8 part by weight of a gas trapping agent selected from the group consisting of triallyl cyanurate and triallyl isocyanurate.

* * * * *